(12) United States Patent
Della Valle

(10) Patent No.: US 7,261,321 B2
(45) Date of Patent: Aug. 28, 2007

(54) SPRUNG ROLL BAR

(75) Inventor: Ernesto Della Valle, Treviglio (IT)

(73) Assignee: Same Deutz-Fahr Group S.p.A., Treviglio (Bergamo) (IT)

( * ) Notice: Subject to any disclaimer, the term of this patent is extended or adjusted under 35 U.S.C. 154(b) by 379 days.

(21) Appl. No.: 10/853,096

(22) Filed: May 26, 2004

(65) Prior Publication Data

US 2005/0156422 A1 Jul. 21, 2005

(30) Foreign Application Priority Data

Jan. 16, 2004 (EP) .................................. 04425021

(51) Int. Cl.
*B60R 21/13* (2006.01)
(52) U.S. Cl. ..................................... 280/756
(58) Field of Classification Search ............... 280/756, 280/783, 781, 784, 796, 748, 755; 180/218
See application file for complete search history.

(56) References Cited

U.S. PATENT DOCUMENTS

| 3,036,858 | A | * | 5/1962 | Fingerut .................... 296/102 |
| 3,561,785 | A | * | 2/1971 | Kidder ....................... 280/756 |
| 4,061,393 | A | * | 12/1977 | Blomstrom ............ 296/190.06 |
| 4,077,655 | A | * | 3/1978 | Skahill ...................... 280/756 |
| 5,890,738 | A | * | 4/1999 | Heiner et al. ............... 280/756 |
| 6,029,764 | A | * | 2/2000 | Schubert .................. 180/89.13 |
| 6,408,970 | B1 | * | 6/2002 | Eng .......................... 180/89.12 |
| 6,726,272 | B1 | * | 4/2004 | Puterbaugh et al. ... 296/190.01 |
| 6,986,545 | B2 | * | 1/2006 | Nilsson et al. ......... 296/190.07 |

* cited by examiner

*Primary Examiner*—Paul N. Dickson
*Assistant Examiner*—Tiffany L. Webb
(74) *Attorney, Agent, or Firm*—Sughrue Mion, PLLC

(57) ABSTRACT

A roll bar, in particular for agricultural machines, comprising a sprung protection structure (12), a plurality of fastening elements (22, 24) destined to be fastened to the body of the farming machine, and a damping device (26) interposed between each fastening element (22, 24) and the sprung protection structure (12).

5 Claims, 3 Drawing Sheets

SPRUNG ROLL BAR

BACKGROUND OF THE INVENTION

The present invention relates to a sprung roll bar, in particular for agricultural machines.

Agricultural machines without cabs are normally provided with a roll bar having two or four uprights, whose purpose is to protect the driver, for instance if the machine rolls over.

In prior art solutions, the roll bar is normally rigidly fastened to the body of the agricultural machine. Therefore, vibrations due to the operation of the engine and to the travel of the agricultural machine are transmitted to the roll bar. The vibrations of the roll bar cause noise and structural stresses of the roll bar itself.

SUMMARY OF THE INVENTION

The object of the present invention is to provide a roll bar for a agricultural machine which overcomes said drawbacks.

According to the present invention, said object is achieved by a roll bar having a plurality of fastening elements destined to be fastened to the body of a farming machine, and a damping device interposed between each fastening element and the sprung protection structure.

BRIEF DESCRIPTION OF THE DRAWINGS

The features and the advantages of the present invention shall become readily apparent from the detailed description that follows, provided purely by way of non limiting example, with reference to the accompanying drawings, in which.

DETAILED DESCRIPTION OF THE INVENTION

Figure 1:
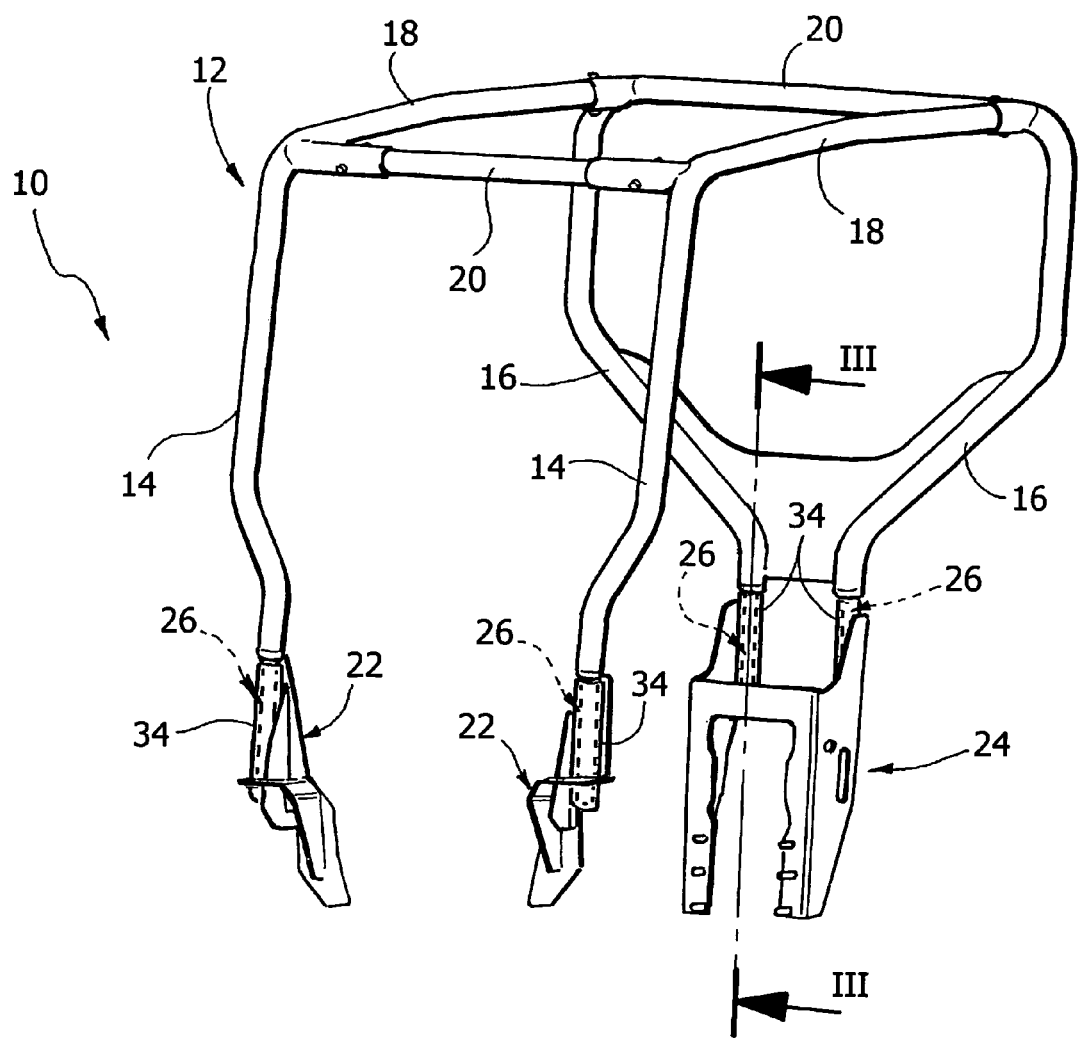
FIG. 1 is a perspective view of a roll bar according to the present invention.
Figure 2:
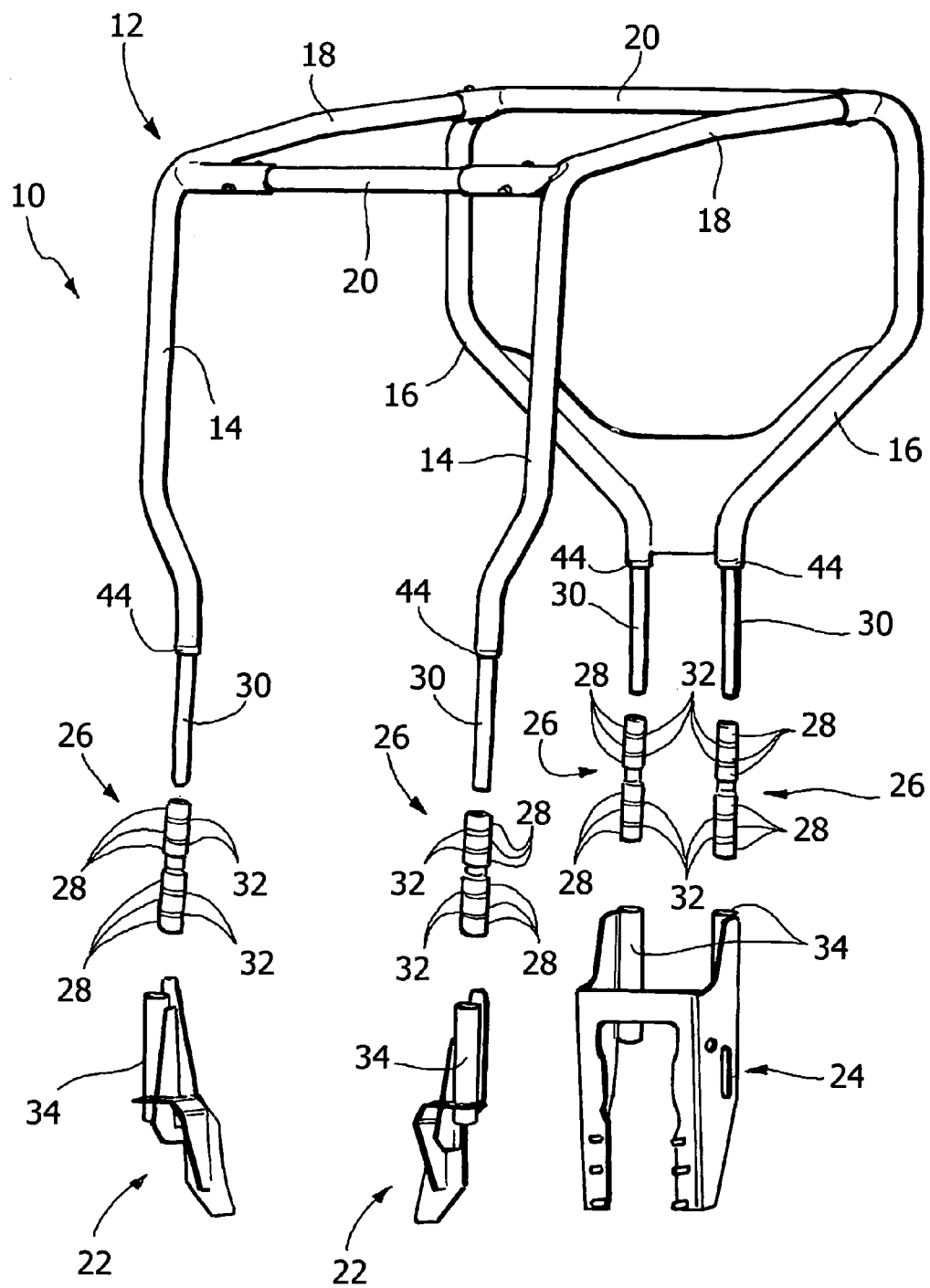
FIG. 2 is an exploded perspective view of the roll bar of FIG. 1.

With reference to the drawings, the number 10 designates a roll bar according to the present invention. The roll bar 10 comprises a sprung protection structure 12 which can have two or four uprights.

In the example illustrated in the drawings, the sprung protection structure 12 comprises two front uprights 14, two rear uprights 16, two longitudinal elements 18, and two transverse elements 20. Each of the two longitudinal elements 18 connects the upper part of a front upright 14 to the upper part of a rear upright 16. The two transverse elements 20 connect the upper part of the front uprights 14 and rear uprights 16 to each other.

The sprung protection structure 12 is fastened to the body of a agricultural machine (not shown) by means of a plurality of fastening elements 22, 24. In the case of four-upright roll bars, two front fastening elements 22 and a rear fastening element 24 are preferably provided. The fastening elements 22, 24 are preferably constituted by pressed or bent steel plate and are provided with holes for their fastening to the body of the agricultural machines by means of screws (not shown).

According to the present invention, the lower end of each upright 14, 16 is connected to a respective fastening element 22, 24 by means of a damping device 26.

Figure 3:
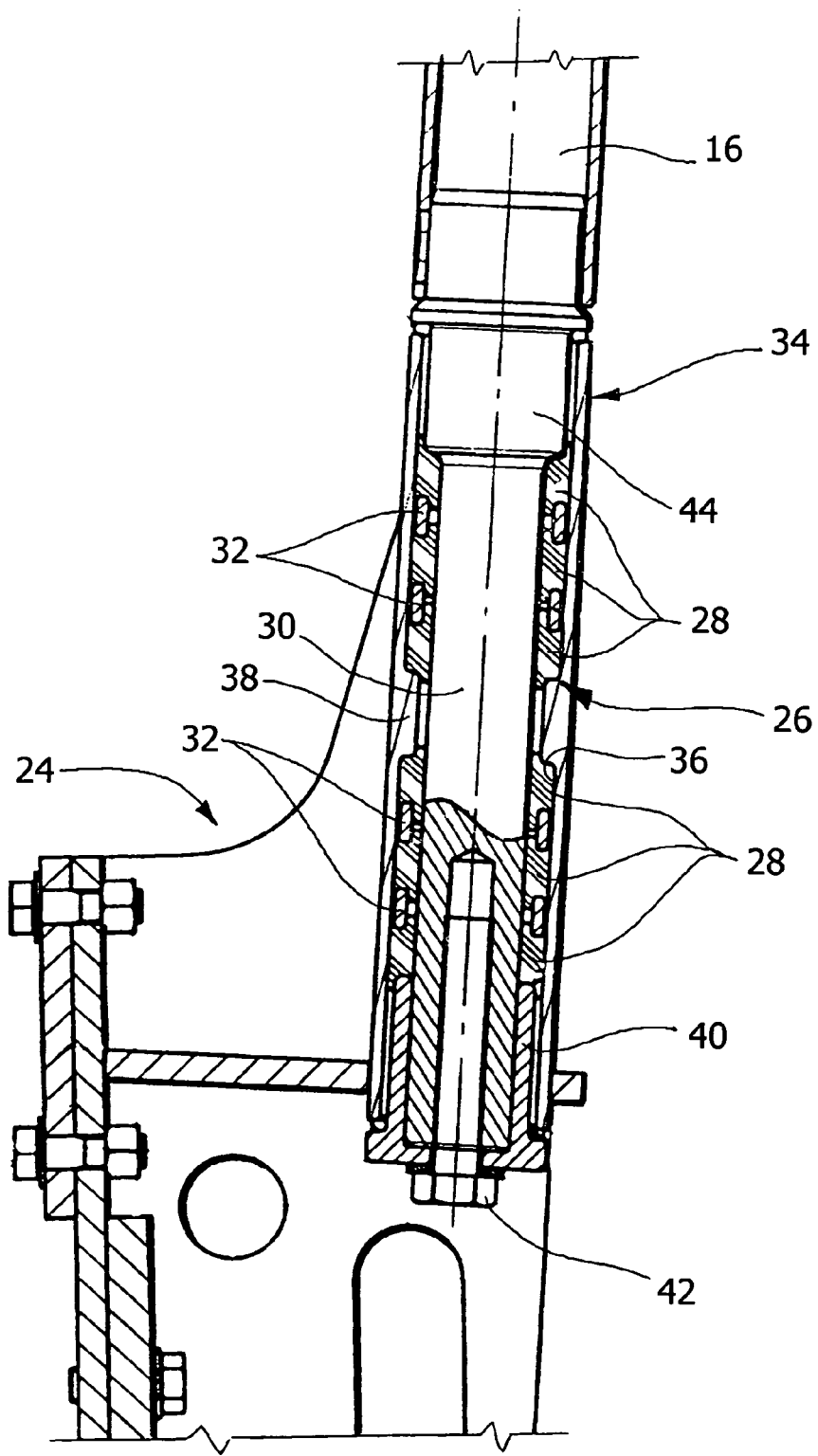
FIG. 3 is a section according to the line III-III of FIG. 1.

With reference in particular to FIG. 3, each damping device 26 comprises a pack of damping members 28 made of elastomeric material. The damping members 28 have annular shape and have respective radially inner surfaces in contact with the outer cylindrical surface of an end portion 30 of the respective upright 14 or 16.

The damping members 28 are distanced from each other in the radial direction by means of ring-shaped metallic spacers 32. The inner diameter of the metallic spacers 32 is greater than the inner diameter of the damping members 28, so the radially inner surfaces of the spacers 32 are distanced in the radial direction from the outer surface of the end portion 30 of the upright 14 or 16.

Each fastening element 22 or 24 is provided with a seat 34 with a vertical axis within which is inserted a respective damping device 26. As shown in FIG. 3, the seat 34 of each fastening element 24 or 26 has an inner surface 36 provided with an inner projection 38 in substantially central position.

The damping members 28 form a cylindrical pack interposed between the outer surface of the terminal portion 30 of the upright 14 or 16 and the inner surface of the seat 34 of the fastening element 22 or 24. The spacers 32 preferably have a flat cross section and have their radially outer surfaces aligned with the radially outer surfaces of the damping members 28. The outer surfaces of the spacers 32 and of the damping members 28 bear against the inner surface 36 of the seat 34.

The pack of the damping members 28 and of the spacers 32 is compressed in the axial direction by means of a cup element 40 fastened to the lower end of the end portion 30 by means of a screw 42. An upper part of the pack of damping members 28 is axially compressed between an upper shoulder 44 of the end portion 30 and the inner projection 38 of the seat 34. A lower part of the pack of damping organs 28 is axially compressed between the cup member 40 and the inner projection 38.

The system for fastening the pack of damping members 28, described above, allows to fasten each upright 14 or 16 to the respective fastening element 22 or 24 in the axial direction and in the radial direction. Each upright 14 or 16 is isolated from direct contact with the respective fastening element 22 or 24 by the pack of damping members 28. The protection structure 12 is therefore sprung with respect to the body of the agricultural machine. The pack of damping members 28 subdivided by the metallic spacers 32 allows the absorption of the energy generated by longitudinal and transverse stresses. This system allows to reduce the vibrations of the roll bar with a consequent structural safeguard of the structure and a reduction in noise.

The system described above can be applied both on two-upright roll bars and on four-upright roll bars. The damping members 28 can have different shape and dimensions according to the applications. Depending on the adopted solution, the shape and the dimensions of the spacers 32 may be varied. The roll bar according to the present invention can be applied to agricultural machines of various kinds, for instance agricultural tractors with tyres or tracks.

What is claimed is:

1. A roll bar, comprising a sprung protection structure, a plurality of fastening elements for fastening the sprung protector structure to a body of a farming machine, and a damping device interposed between each fastening element and the sprung protection structure, wherein said damping device comprises a pack of damping members made of elastomeric material, distanced from each other by metallic spacers.

2. A roll bar as claimed in claim 1, wherein the damping members have annular shape and are inserted on a cylindrical end portion of a respective upright of the sprung protection structure.

3. A roll bar as claimed in claim 2, wherein the pack of damping members is housed in a seat of a respective fastening element with radially outer surfaces of the damping members in contact with an inner surface of the seat.

4. A roll bar as claimed in claim 3, wherein the pack of damping members and spacers are compressed axially.

5. A roll bar as claimed in claim 4, wherein an upper part of the pack of damping members is compressed axially between an inner projection of the seat and an upper shoulder of the end portion of the upright, and a lower part of the pack of damping members is compressed axially between said inner projection and a cup element fastened to an end of a terminal portion.

* * * * *